United States Patent Office 3,655,659
Patented Apr. 11, 1972

1

3,655,659
3-THIADIAZOLYLTETRAHYDRO-1,3,5-
OXADIAZIN-4-ONES
Patrick R. Driscoll, Spotswood, N.J., assignor to
Mobil Oil Corporation
No Drawing. Filed Dec. 29, 1969, Ser. No. 888,916
Int. Cl. C07d 91/62
U.S. Cl. 260—244 R                6 Claims

ABSTRACT OF THE DISCLOSURE 3-thiadiazolyltetrahydro-1,3,5-oxadiazin-4-ones form a new class of herbicides. They are effective as both pre-emergence and post-emergence herbicides. They are highly effective against crabgrass, Johnson grass, barnyard grass, pigweed, and turnip (representative of weedy mustards).

BACKGROUND OF THE INVENTION

Field of the invention

This invention is directed to novel 3-thiadiazolyltetrahydro-1,3,5-oxadiazin-4-ones and their use as herbicides. It is more particularly concerned with substituted tetrahydro-1,3,5-oxadiazin-4-ones prepared from substituted thiadiazole ureas.

Description of prior art

In British Pat. No. 1,093,407, there are disclosed substituted 1,3,5-oxadiazin-4-ones prepared from phenyl ureas as new compounds and as herbicides. In U.S. Pat. No. 3,294,793, there are disclosed tetrahydro-1,3,5-oxadiazin-4-ones, again prepared from phenyl ureas, as new compounds.

SUMMARY OF THE INVENTION

This invention provides compounds having the formula:

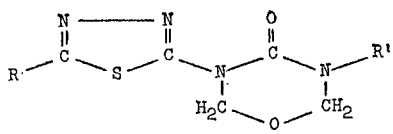

wherein R is hydrogen, alkyl ($C_1$–$C_6$), haloalkyl ($C_1$–$C_6$), cycloalkyl ($C_3$–$C_6$), halocycloalkyl ($C_3$–$C_6$), alkoxy, alkoxyalkylthio, aryl, substituted aryl, alkenyl ($C_2$–$C_6$), alkylthio ($C_1$–$C_{12}$), alkenylthio ($C_2$–$C_{12}$), alkynylthio ($C_2$–$C_{12}$), benzylthio, substituted benzylthio, epoxyalkylthio, haloalkylthio, haloalkenlthio, cyanoalkylthio, carbalkoxyalkylthio, acylalkylthio, aminoalkylthio, dialkyl ($C_1$–$C_{12}$) aminoalkenylthio, alkylsulfinyl ($C_1$–$C_6$), or alkylsulfonyl ($C_1$–$C_6$), and $R^1$ is hydrogen, alkyl ($C_1$–$C_8$), or cycloalkyl ($C_3$–$C_6$); their use as herbicides; and herbicidal compositions comprising at least one such compound and a carrier therefor.

DESCRIPTION OF SPECIFIC EMBODIMENTS

As will be noted from the above formula, the compounds of this invention are substituted tetrahydro-1,3,5-oxadiazin-4-ones prepared from substituted thiadiazole ureas. Not-limiting examples of the compounds of this invention include:

3-[5-trifluoromethyl-2-(1,3,4-thiadiazolyl)]-
5-methyltetrahydro-1,3,5-oxadiazin-4-one;
3-[5-methylthio-2-(1,3,4-thiadiazolyl)]-
5-methyltetrahydro-1,3,5-oxadiazin-4-one;
3-[5-ethylthio-2-(1,3,4-thiadiazolyl)]-
5-methyltetrahydro-1,3,5-oxadiazin-4-one;

2

3-[5-n-propylthio-2-(1,3,4-thiadiazolyl)]-
5-methyltetrahydro-1,3,5-oxadiazin-4-one;
3-[-(1,3,4-thiadiazolyl)]-5-methyltetrahydro-
1,3,5-oxadiazin-4-one;
3-[5-methyl-2-(1,3,4-thiadiazolyl)]-
5-methyltetrahydro-1,3,5-oxadiazin-4-one;
3-[5-n-propyl-2-(1,3,4-thiadiazolyl)]-
5-methyltetrahydro-1,3,5-oxadiazin-4-one;
3-[5-cyclopentyl-2-(1,3,4-thiadiazolyl)]-
5-methyltetrahydro-1,3,5-oxadiazin-4-one;
3-[5-methoxy-2-(1,3,4-thiadiazolyl)]-
5-methyltetrahydro-1,3,5-oxadiazin-4-one;
3-[5-phenyl-2-(1,3,4-thiadiazolyl)]-
5-methyltetrahydro-1,3,5-oxadiazin-4-one;
3-[5-ethenyl-2-(1,3,4-thiadiazolyl)]-
5-methyltetrahydro-1,3,5-oxadiazin-4-one;
3-[5-ethenylthio-2-(1,3,4-thiadiazolyl)]-
5-methyltetrahydro-1,3,5-oxadiazin-4-one;
3-[5-ethynylthio-2-(1,3,4-thiadiazolyl)]-
5-methyltetrahydro-1,3,5-oxadiazin-4-one;
3-[5-phenylthio-2-(1,3,4-thiadiazolyl)]-
5-methyltetrahydro-1,3,5-oxadiazin-4-one;
3-[5-trifluoromethylthio-2-(1,3,4-thiadiazolyl)]-
5-methyltetrahydro-1,3,5-oxadiazin-4-one;
3-[5-trifluoromethyl-2-(1,3,4-thiadiazolyl)]-
5-ethyltetrahydro-1,3,5-oxadiazin-4-one;
3-[5-trifluoromethyl-2-(1,3,4-thiadiazolyl)]-
5-cyclopentyltetrahydro-1,3,5-oxadiazin-4-one;
3-[5-methylthio-2-(1,3,4-thiadiazolyl)]-
5-ethyltetrahydro-1,3,5-oxadiazin-4-one;
3-[5-methylthio-2-(1,3,4-thiadiazolyl)]-
5-cyclopentyltetrahydro-1,3,5-oxadiazin-4-one;
3-[5-n-propylthio-2-(1,3,4-thiadiazolyl)]-
5-ethyltetrahydro-1,3,5-oxadiazin-4-one; and
3-[5-n-propylthio-2-(1,3,4-thiadiazolyl)]-
5-cyclopentyltetrahydro-1,3,5-oxadiazin-4-one.

The compounds of this invention are readily prepared by the general procedure:

An appropriate thiadiazole urea substituted in the 5-position of the ring with an appropriate group hereinbefore defined as R and in the 1-position of the urea with a methyl group is reacted with trioxane. The reactants are added, in portions, to cold sulfuric acid solution. The mixture is left standing for a period of time and neutralized with sodium hydroxide solution. The solid product formed is extracted, purified, and recrystallized from methanol-water.

The following examples demonstrate the typical procedure. Structural vertification by IR and NMR is shown in Table I following the examples.

EXAMPLE 1

3-[5-trifluoromethyl-2-(1,3,4-thiadiazolyl)]-
5-methyltetrahydro-1,3,5-oxadiazin-4-one 1-methyl-3-[5-trifluoromethyl - 2 - (1,3,4-thiadiazolyl)] urea (10.0 g., 0.044 mole) and trioxane (4.0 g., 0.044 mole, equivalent to 0.132 mole of formaldehyde) were added, in portions, to cold 85% sulfuric acid (118 g.). After standing overnight at 25° C., the solution was neutralized with 40% sodium hydroxide. The solid that formed was extracted with 100 ml. of chloroform and the chloroform was dried over calcium sulfate. The chloroform was removed by distillation and 4.8 g. (yield 40%) of yellow solid was obtained. The solid was recrystallized from methanol-water to give a tan solid with a melting point of 83–85° C. IR and NMR support the proposed structure (Table I).

Elemental analysis.—Calcd. (percent): C, 31.34; H, 2.63. Found (percent): C, 31.18; H, 2.43.

EXAMPLE 2

3-[5-methylthio-2-(1,3,4-thiadiazolyl)]-5-methyltetrahydro-1,3,5-oxadiazin-4-one Same procedure as in Example 1 using 1-methyl-3-[5-methylthio-2-(1,3,4-thiadiazolyl)] urea (10.0 g., 0.049 mole) and trioxane (4.4 g., 0.049 mole). 6.7 g. of pink solid (yield 55%) was obtained with a melting point of 110–115° C. IR and NMR support the proposed structure (Table I).

EXAMPLE 3

3-[5-ethylthio-2-(1,3,4-thiadiazolyl)]-5-methyltetrahydro-1,3,5-oxadiazin-4-one

Same procedure as in Example 1 using 1-methyl-3-[5-ethylthio-2-(1,3,4-thiadiazolyl)] urea (10.0 g., 0.046 mole) and trioxane (4.3 g., 0.046 mole). 4.2 g. of yellow solid (yield 35%) was obtained with a melting point of 76–79° C. IR and NMR support the proposed structure (Table I).

EXAMPLE 4

3-[5-n-propylthio-2-(1,3,4-thiadiazolyl)]-5-methyltetrahydro-1,3,5-oxadiazin-4-one Same procedure as in Example 1 using 1-methyl-3-[5-propylthio-2-(1,3,4-thiadiazolyl)] urea (6.4 g., 0.028 mole) and trioxane (2.6 g., 0.028 mole). 4.0 g. of yellow solid (yield 52%) was obtained with a melting point of 85–88° C. IR and NMR support the proposed structure (Table I).

TABLE I.—STRUCTURAL VERIFICATION OF COMPOUNDS OF THE EXAMPLES

| Example | IR values | NMR values |
|---|---|---|
| 1 | λ(KBr) 5.92 (S), 6.71 (S)μ | δ (CDCl₃) 5.66 (2H, singlet), 4.99 (2H, singlet) 3.20 (3H, singlet) p.p.m. |
| 2 | λ(KBr) 5.96 (S), 6.72 (S)μ | δ (CDCl₃) 5.58 (2H, singlet), 4.88 (2H, singlet), 3.00 (3H, singlet), 2.68 (3H, singlet) p.p.m. |
| 3 | λ(KBr) 5.98 (S), 6.78 (S)μ | δ (CDCl₃) 5.59 (2H, singlet), 4.90 (2H, singlet), 3.18 (2H, quartet), 3.00 (3H, singlet), 1.42 (3H, triplet) p.p.m. |
| 4 | λ(KBr) 6.00 (S), 6.79 (S)μ | δ (CDCl₃) 5.57 (2H, singlet), 4.88 (2H, singlet), 3.10 (2H, quartet), 2.98 (3H, singlet), 1.90 to 1.58 (2H, multiplet), 1.02 (3H, triplet) p.p.m. |

Compounds of the examples were subjected to the following herbicidal tests. The results are set forth in Table II following the test descriptions.

HERBICIDE TESTING METHODS

The test species propagated for testing are: Crabgrass, yellow foxtail grass, Johnson grass, barnyard grass, pigweed, turnip, cotton, corn, and bean.

Each specie is planted individually in 3 inch plastic pots containing potting soil. Four seeds each of the corn, cotton, and bean are seeded to a depth equal to the diameter of the seed. The other species are surface seeded and sprinkled with screened soil in an amount sufficient to cover the seed. Immediately after planting, all pots are watered by subirrigation in greenhouse trays. Pots for the pre-emergence phase of testing are seeded one day before treatment.

Planting dates for the post-emergence phase of testing are varied so that all seedlings will reach the desired stage of development simultaneously. The proper stage of seedling development simultaneously. The proper stage of seedling development for treatment in the post-emergence tests is as follows.

| | |
|---|---|
| Grasses | 2 inches in height. |
| Pigweed and turnips | 1 or 2 true leaves visible above cotyledons. |
| Cotton | First true leaf 1 inch in length; expanded cotyledons. |
| Corn | 3 to 4 inches in height. |
| Beans | Primary leaves expanded, growing point at primary leaf node. |

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened at a rate of application equivalent to 4 lbs. actual/acre in a spray volume of 38 gal./acre. Spray hood constants required to deliver the above volume are as follows.

| | |
|---|---|
| Belt speed | 2 m.p.h. |
| Air pressure | Adjusted to provide 38 g.p.a. delivery. |
| Nozzle tip | 8003E (provides uniform cross-section flat spray). |

Formulations for spray applications (as used in the compositions for which data are set forth in the table hereinafter are prepared in 50 ml. volumes with the following components:

(1) 0.62 gram compound (4 lb./acre rate)
(2) 49 ml. of acetone as solvent
(3) 1 ml. xylene-Atlox 3414 (a surface-active emulsifier).

Compounds that are insoluble in the customary solvents are formulated either in the Waring blendor and applied as suspensions with suitable carriers or dispersants or prepared initially as wettable powders. Compounds that are not available in sufficient quantity for machine spraying are applied by hand with a DeVilbiss atomizer.

Two weeks after treatment, pre- and post-emergence injury or control is visually rated as percent injury or control (percent effectiveness).

TABLE II.—HERBICIDAL ACTIVITY (Percent Effectiveness)

| Compound of example | Compound conc., lbs./acre | Crabgrass | Yellow foxtail grass | Johnson grass | Barnyard grass | Pigweed | Turnip | Cotton | Corn | Bean |
|---|---|---|---|---|---|---|---|---|---|---|
| | | | | Pre-emergence | | | | | | |
| 1 | 4 | 80 | | 40 | 60 | | 90 | 80 | 30 | 70 |
| 1 | 2 | | | | | 100 | 100 | | | |
| 2 | 4 | 40 | | 20 | 30 | | 50 | 50 | 30 | 70 |
| 3 | 4 | 40 | | 50 | 40 | 100 | 90 | 80 | 0 | 100 |
| 4 | 4 | 90 | | 30 | 50 | 90 | 0 | 30 | 0 | 100 |
| | | | | Post-emergence | | | | | | |
| 1 | 4 | 90 | | 90 | 80 | | 100 | 100 | 60 | 100 |
| 1 | 2 | 60 | | | | | 100 | 60 | 30 | 60 |
| 1 | 1 | | | | | 80 | 70 | | | |
| 2 | 4 | 90 | 40 | 40 | 40 | | 100 | 100 | 40 | 100 |
| 2 | 2 | 40 | | 30 | 20 | 90 | 100 | 90 | 20 | 100 |
| 2 | 1 | | | 80 | 80 | | | | | |
| 3 | 4 | 70 | | 40 | | 100 | 90 | 50 | 50 | 100 |
| 4 | 4 | 70 | | 50 | | 100 | 70 | 100 | 50 | 70 |

From the data in this table, it will be noted that the 3-thiadiazolyltetrahydro-1,3,5-oxadiazin-4-ones of this invention have a broad range of both pre- and post emergence herbicidal activity. They are highly effective against crabgrass and barnyard grass, annual grass weeds which reproduce by seeds and are problems in lawns and field crops. They are also highly effective against Johnson grass, a perennial grass weed which reproduces by seed and underground rhizomes and is a problem in field crops. Also, they are effective against pigweed, an annual broadleaf weed which reproduces by seed and is one of the most serious broadleaf weed problems in major argonomic crops.

The compounds of this invention exhibit considerable pre- and post-emergence herbicidal activity and are disclosed for use in various ways to achieve pre-emergence or past-emergence contact control of undesirable herbs. They can be applied per se, as solids or in vaporized form, but are preferably applied as the toxic components in her bicidal compositions of the compound and a carrier. The compositions can be applied as dusts, as liquid sprays or as gas-propelled sprays and can contain, in addition to carrier, additive such as emulsifying agents, wetting agents, binding agents, gases compressed to the liquid state, odorants, stabilizer and the like. A wide variety of liquid and solid carriers can be used in the herbicidal compositions. Non-limiting examples of liquid carriers include water; organic solvents such as alcohols, ketones, amides, and esters; mineral oils such as kerosene, light oils, and medium oils; and vegetable oils such as cottonseed oil. Non-limiting examples of solid carriers include talc, bentonite, diatomaceous earth, pyrophyllite, Fuller's earth, gypsum, flours derived from cottonseeds and nut shells, and various natural and synthetic clays having a pH not exceeding about 9.5.

The amount of the compounds of this invention utilized in herbicidal compositions will vary rather widely. It depends to some extent upon the type of composition in which the material is being used, the nature of the condition to be controlled, and the method of application (i.e., spraying, dusting, etc.). In the ultimate herbicidal composition, as applied in the field, herbicide concentrations as low as 0.0001 weight percent of the total composition can be used. In general, compositions, as applied, containing about 0.05 weight percent herbicide in either liquid or solid carrier give excellent results. In some cases, however, stronger dosages up to about 10 weight percent may be required.

In practice, herbicidal compositions are usually prepared in the form of concentrates, which are diluted in the field to the concentration desired for application. For example, the concentrate can be a wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of herbicides desired for application. Other concentrates can be solutions that can be later diluted, e.g., with kerosene, thus, it is within the contemplation of this invention to provide herbicidal compositions containing up to about 80 percent, by weight of the composition, of a herbicidal compound of this invention. Accordingly, depending upon whether it is ready for application or it is in concentrated form, the contemplated herbicidal compositions contain between about 0.0001 percent and about 80 percent, by weight of the composition, of a herbicidal compound of this invention, and a carrier, liquid or solid, as defined hereinbefore.

Although the present invention has been described with preferred embodiments, it is to be understood that modifications and variations may be resorted to, without departing from the spirit and scope of the invention, as those skilled in the art will readily understand.

What is claimed is:

1. A compound having the formula:

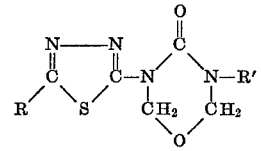

wherein R is hydrogen, alkyl ($C_1$–$C_6$), trifluoromethyl, cyclopentyl, methoxy, phenyl, alkenyl ($C_2$–$C_6$), alkylthio ($C_1$–$C_{12}$), ethenylthio, ethynylthio, benzylthio or trifluoromethylthio, and R' is hydrogen, alkyl ($C_1$–$C_8$), or cyclopentyl.

2. A compound as defined in claim 1, wherein R is trifluoromethyl or alkylthio ($C_1$–$C_{12}$), and R' is alkyl ($C_1$–$C_8$).

3. The compound of claim 1, having the following structure:

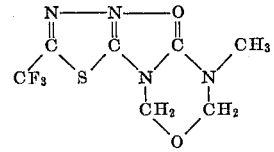

4. The compound of claim 1, having the following structure:

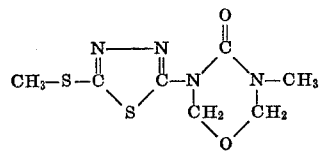

5. The compound of claim 1, having the following structure:

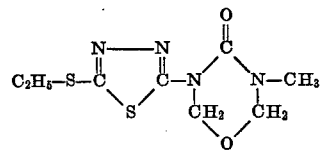

6. The compound of claim 1, having the following structure:

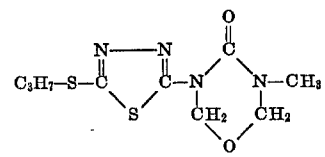

References Cited

UNITED STATES PATENTS 3,294,793   12/1966   Seidel _____ 260—244

HENRY R. JILES, Primary Examiner

G. T. TODD, Assistant Examiner

U.S. Cl. X.R.

424—248